(12) United States Patent
Kang et al.

(10) Patent No.: US 11,720,148 B2
(45) Date of Patent: Aug. 8, 2023

(54) PORTABLE ELECTRONIC DEVICE HAVING ROLLABLE DISPLAY STRUCTURE

(71) Applicant: LG ELECTRONICS INC., Seoul (KR)

(72) Inventors: Lai O Kang, Seoul (KR); Hyo Sik Shin, Seoul (KR); Byeong Duk An, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/594,928

(22) PCT Filed: Sep. 5, 2019

(86) PCT No.: PCT/KR2019/011510
§ 371 (c)(1),
(2) Date: Nov. 3, 2021

(87) PCT Pub. No.: WO2020/230956
PCT Pub. Date: Nov. 19, 2020

(65) Prior Publication Data
US 2022/0326735 A1 Oct. 13, 2022

Related U.S. Application Data

(60) Provisional application No. 62/847,224, filed on May 13, 2019.

(51) Int. Cl.
*G06F 1/16* (2006.01)
*G06F 3/02* (2006.01)
*G06F 3/023* (2006.01)

(52) U.S. Cl.
CPC ............ *G06F 1/1652* (2013.01); *G06F 3/021* (2013.01); *G06F 3/023* (2013.01); *G06F 3/0221* (2013.01)

(58) Field of Classification Search
None
See application file for complete search history.

(56) References Cited

U.S. PATENT DOCUMENTS

2004/0052037 A1\* 3/2004 Sawyer ................. G06F 1/1652
361/679.05
2006/0107566 A1 5/2006 Van Rens
(Continued)

FOREIGN PATENT DOCUMENTS

JP 18113581 4/2006
JP H2015513148 4/2015
(Continued)

OTHER PUBLICATIONS

Korean Intellectual Property Office Application Serial No. 10-2021-7035703, Office Action dated Nov. 29, 2022, 6 pages.

*Primary Examiner* — Carl Adams
(74) *Attorney, Agent, or Firm* — Lee Hong Degerman Kang Waimey

(57) ABSTRACT

A portable electronic device having a rollable display structure is proposed. When the rollable display panel is unrolled from the display drum inside the housing and drawn out of the housing, a self-standing guide unit guides the rollable display panel to be curved in an arc shape so that the rollable display panel stands upright on its own, whereby the rollable display panel may be maintained in an unrolled state without an additional structure. In this way, the size and weight of a product may be reduced, so that portability of the portable electronic device may be improved.

12 Claims, 13 Drawing Sheets

(56) References Cited

U.S. PATENT DOCUMENTS

2008/0261661 A1* 10/2008 Jessop ................. G02B 26/004
 345/169
2017/0212607 A1 7/2017 Yoon

FOREIGN PATENT DOCUMENTS

| KR | 1020140086712 | 7/2014 |
|----|---------------|--------|
| KR | 1020170017157 | 2/2017 |
| KR | 1020170061593 | 6/2017 |
| KR | 1020170079897 | 7/2017 |
| KR | 1020170089664 | 8/2017 |

* cited by examiner

PORTABLE ELECTRONIC DEVICE HAVING ROLLABLE DISPLAY STRUCTURE

CROSS-REFERENCE TO RELATED APPLICATIONS

This application is the National Stage filing under 35 U.S.C. 371 of International Application No. PCT/KR2019/011510, filed on Sep. 5, 2019, which claims the benefit of U.S. Provisional Application No. 62/847,224, filed on May 13, 2019, the contents of which is hereby incorporated by reference herein in its entirety.

TECHNICAL FIELD

The present disclosure relates to a portable electronic device having a rollable display structure and, more particularly, to a portable electronic device having a rollable display structure in which a display is configured to display images in the portable electronic device such as a laptop, a tablet, and a notebook.

BACKGROUND ART

In general, an image display device using a flat-panel display panel, such as a liquid crystal display panel, an organic light emitting display panel, an electrophoretic display panel, or the like have been widely used to display images on a TV, a monitor, and a portable electronic device such as a laptop, a tablet, a notebook, etc.

The conventional flat-panel display panel has limitations in its applications and uses because of using an inflexible glass substrate. However, in recent years, a display panel that may be curved by using a flexible substrate instead of the inflexible glass substrate has been popularized, and presently, the display panel has reached a technological level up to the flexible display panel capable of being rollable or foldable beyond the level in which a display panel is simply bendable.

When a rollable display panel (hereinafter referred to as a "rollable display panel") is implemented by using a flexible display panel, the rollable display panel is maintained in a way of being rolled around a cylindrical drum or roller in normal times, and when in use, the rollable display panel is released from the drum or roller and unrolled to be used.

Here, since the rollable display panel itself has flexibility, when applied to a TV, a support structure is required in order to maintain the rollable display panel in an unrolled state.

As an example, in a rollable display device disclosed in Korean Patent Application Publication No. 10-2019-0051541, a hinged folding unit that is configured to maintain an unrolled state while moving a rollable display panel upward and downward is disclosed.

In the case of a hinged foldable structure disclosed in the Korean Patent Application Publication, the structure is useful in that the rollable display panel may stably maintain the unrolled state, but there is a disadvantage in that the structure is complex and the size thereof is large to be applied to a portable electronic device such as a laptop, a tablet, and a notebook.

In particular, in the case of a portable electronic device such as a laptop, a tablet, and a notebook, since users often perform tasks by using a keyboard or mouse with a display screen kept standing upright, the development of a rollable display structure capable of maintaining the rollable display panel kept standing upright while reducing the size or weight thereof is required in order to increase portability of the portable electronic device.

DISCLOSURE

Technical Problem

In a portable electronic device such as a laptop, a tablet, and a notebook, an objective of the present disclosure is to provide the portable electronic device in which a display for displaying images has a rollable display structure while having a simplified structure to maintain a rollable display panel to stand upright, so as to reduce the weight and size, thereby increasing portability of the portable electronic device.

Another objective of the present disclosure is to provide a portable electronic device capable of increasing the portability thereof by allowing a rollable display panel to stand upright on its own by using the characteristics of the rollable display panel itself.

Yet another objective of the present disclosure is to provide a portable electronic device that provides convenience in operation by enabling motions of unrolling and rolling a rollable display panel with a simple operation.

Still another objective of the present disclosure is to provide a portable electronic device capable of providing convenience of portability by applying a rollable keyboard.

Still another objective of the present disclosure is to provide a portable electronic device in which rollable display devices of various sizes are compatible with a detachable keyboard, thereby increasing scalability of a screen size.

Technical Solution

In a portable electronic device according to an exemplary embodiment of the present disclosure, a self-standing guide unit is configured to guide a rollable display panel to be curved in an arc shape so that the rollable display panel stands upright on its own when the rollable display panel is unrolled from the display drum inside a housing and drawn out of the housing, whereby the rollable display panel may be maintained in an unrolled state without an additional structure.

The housing may include a display drawing-out slot through which the rollable display panel passes when the rollable display panel is rolled or unrolled, and the self-standing guide unit may be installed between the display drum and the display drawing-out slot to guide the rollable display panel.

The self-standing guide unit may include a first guide roller rotatably installed between the display drum and the display drawing-out slot and a second guide roller, a guide slot through which the rollable display panel passes may be formed between the first guide roller and the second guide roller, and the guide slot may have a curved shape in a horizontal direction, so as to allow the rollable display panel to be curved in the arc shape.

The first guide roller may have a convex curved surface formed thereon toward a central part thereof along a rotating shaft thereof, and the second guide roller may have a concave curved surface formed thereon toward a central part thereof along a rotating shaft thereof, whereby the guide slot may have the curved shape in the horizontal direction.

As another example, the first guide roller and the second guide roller may be curved to have the arc shape in a longitudinal direction so that the guide slot has the curved shape in the horizontal direction, and each rotating shaft on opposite sides of the first guide roller and the second guide roller may be formed to have a predetermined angle in a respective curved direction.

As another exemplary embodiment of the self-standing guide unit, the self-standing guide unit may include: a first side guide unit configured to guide an edge region of one side of the rollable display panel in a horizontal direction; a second side guide unit; and at least one inner guide unit may be disposed to be deviated from an extension line between the first side guide unit and the second side guide unit, so as to bend the rollable display panel in the arc shape when the rollable display panel is unrolled from the display drum between the first side guide unit and the second side guide unit.

The first side guide unit and the second side guide unit may respectively include a pair of side guide rollers configured to guide the rollable display panel by respectively contacting front and rear surfaces of the rollable display panel, and the inner guide unit may include an inner guide roller configured to rotate by contacting the rollable display panel.

The rollable display panel may include: a first surface configured to face the display drum when rolled around the display drum; and a second surface opposite the first surface, and as another example of the self-standing guide unit, the self-standing guide unit may guide the rollable display panel in a state of contacting the second surface of the rollable display panel.

In an exemplary embodiment in which the self-standing guide unit guides in contact with the second surface, the self-standing guide unit may include a concave guide roller rotatably, and a surface of the concave guide roller may be formed to be concave in a direction of the second surface so as to bend the rollable display panel in the arc shape.

In the exemplary embodiment in which the self-standing guide unit guides in contact with the second surface, the self-standing guide unit may include a first side guide roller configured to rotate in a state of contacting the second surface of an edge region of one side of the rollable display panel in a horizontal direction; a second side guide roller; and an inner guide roller disposed to be deviated, in a direction of the second surface, from an extension line between the first side guide roller and the second side guide roller, so as to bend the rollable display panel in the arc shape between the first side guide roller and the second side guide roller.

According to the exemplary embodiment of the present disclosure, the portable electronic device may further include: a torsion spring installed on the display drum to apply a torque in a direction in which the rollable display panel is rolled around the display drum; and a stopper unit configured to control the rollable display panel from being rolled into by the torsion spring in a state of being unrolled from the display drum.

In the portable electronic device according to the exemplary embodiment of the present disclosure, the display drum may be divided into a rolling region on which the rollable display panel is rolled, and an extension region configured to extend to either side of opposite sides of the rolling region in the horizontal direction, a plurality of locking jaws may be formed on an outer surface of the extension region along the rotation direction of the display drum, the stopper unit may include a stopper member installed in the housing so as to be usable between a locking position caught on the locking jaws and a release position spaced apart from the locking jaws and an elastic spring pressing the stopper member in a direction of the locking position, whereby rotation of the display drum may overcome a force applied by the elastic spring to retract the stopper member in the direction of the release position when the display drum rotates in a direction in which the rollable display panel is unrolled.

According to the exemplary embodiment of the present disclosure, the portable electronic device may further include: a rollable keyboard as an input device; and a keyboard drum rotatably installed inside the housing so that the rollable keyboard is rolled or unrolled, wherein a keyboard slot through which the rollable keyboard passes is formed in the housing toward a front thereof.

According to the exemplary embodiment of the present disclosure, the portable electronic device may further include: a first connector for signal transmission; a detachable keyboard having at least one first permanent magnet generating a magnetic force in a direction of a surface on which the first connector is formed; a second connector exposed toward a front of the housing so as to allow the first connector to connect thereto; and a second permanent magnet attached, by the magnetic force of the first permanent magnet, at a position corresponding to the first permanent magnet when the first connector is connected to the second connector by the detachable keyboard approaching the front of the housing.

According to the exemplary embodiment of the present disclosure, the portable electronic device may further include: a first connector; at least one first permanent magnet generating a magnetic force in a direction of a surface on which the first connector is formed; a keyboard unit having a keyboard formed thereon; a touch pad unit having a touch pad formed thereon; a foldable keyboard having a hinge module configured to connect the keyboard unit and the touch pad unit so as to fold the keyboard unit and the touch pad unit; a second connector exposed toward a front of the housing so as to allow the first connector to connect thereto; and a second permanent magnet attached, by the magnetic force of the first permanent magnet, at a position corresponding to the first permanent magnet when the first connector is connected to the second connector by a detachable keyboard approaching the front of the housing.

Advantageous Effects

The portable electronic device having the rollable display structure according to the present disclosure has one or more of the following effects:

First, when a rollable display panel is drawn out of a housing, a self-standing guide unit allows the rollable display panel to stand upright on its own only by guiding the rollable display panel to be curved in an arc shape, whereby the size and weight of the portable electronic device may be significantly reduced.

Second, the size and weight of the structure for maintaining the rollable display panel in an unrolled state is reduced, whereby portability of the portable electronic device may be improved.

Third, a display drawing-out slot formed in the housing has a curved shape, so that even when the width of the display drawing-out slot is not formed relatively wide, a phenomenon in which a surface of the rollable display panel collides with an inner wall surface of the display drawing-out slot and is damaged may be prevented from occurring in a process where the rollable display panel is drawn out through the display drawing-out slot.

Fourth, each pair of rollers guide the rollable display panel to have a curved state, whereby a more stable arc shape may be maintained.

Fifth, even when the rollable display panel is guided to have the curved state by a single roller, the rollable display panel may be able to maintain the arc shape by a force that spreads outward in a radial direction of a display drum of the rollable display panel.

Sixth, by using a torsion spring and a stopper unit, the rollable display panel is unrolled only by a user pulling up an upper self-standing cover, and the rollable display panel is rolled around the display drum only by pushing the stopper unit, whereby the rollable display panel may be usable with only a simple operation.

Seventh, structures of various keyboards such as a rollable keyboard, a detachable keyboard, and a foldable keyboard may be applicable, and product utilization may be increased through standardization of a connection structure of the detachable keyboard.

BEST MODE

Figure 1:
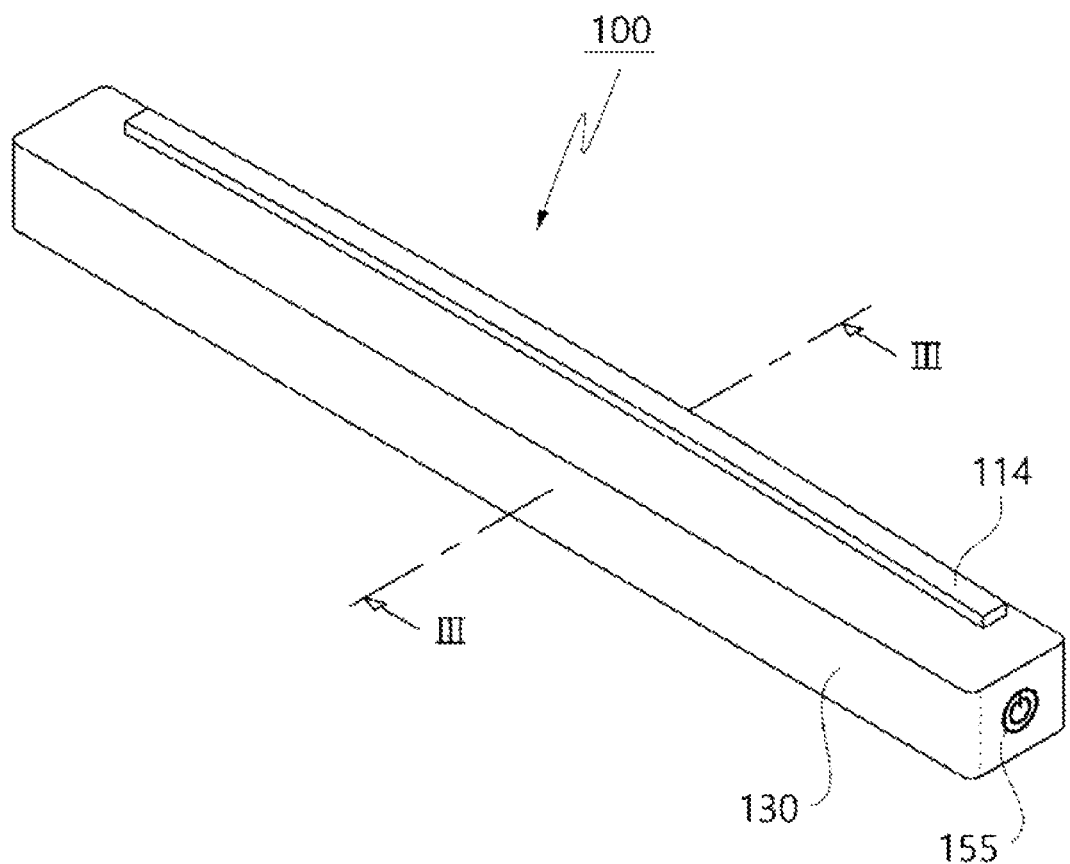
FIGS. 1 and 2 are perspective views illustrating a portable electronic device having a rollable display structure according to an exemplary embodiment of the present disclosure.

A portable electronic device having a rollable display structure according to the present disclosure includes: a rollable display panel configured to display an image; a display drum configured to rotate so that the rollable display panel is rolled or unrolled; a housing having the display drum rotatably installed therein; and a self-standing guide unit configured to guide the rollable display panel to be curved in an arc shape so that the rollable display panel stands upright on its own when the rollable display panel is unrolled from the display drum and drawn out of the housing.

Mode for Invention

Advantages and features of the present disclosure, and a method of achieving them will become apparent with reference to the exemplary embodiments described below in detail together with the accompanying drawings. However, the present disclosure is not limited to the exemplary embodiments disclosed below, but will be implemented in a variety of different forms. These exemplary embodiments are provided only to complete the disclosure of the present disclosure and to completely inform the scope of the present disclosure to those skilled in the art to which the present disclosure pertains, and the present disclosure is only defined by the scope of the claims. Like reference numerals generally denote like elements throughout the present disclosure.

Hereinafter, exemplary embodiments of the present disclosure will be described in detail with reference to the accompanying drawings.

Figure 2:
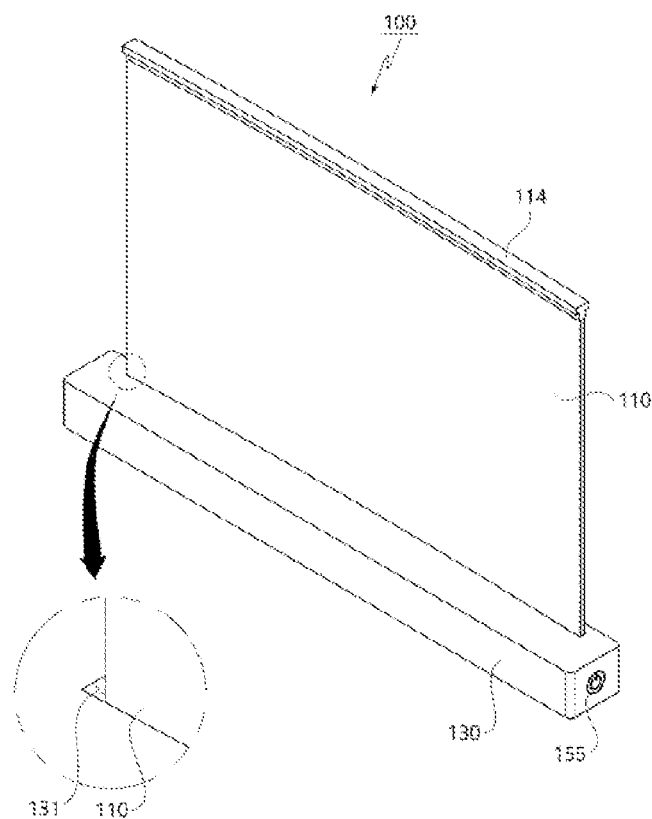
Figure 3:
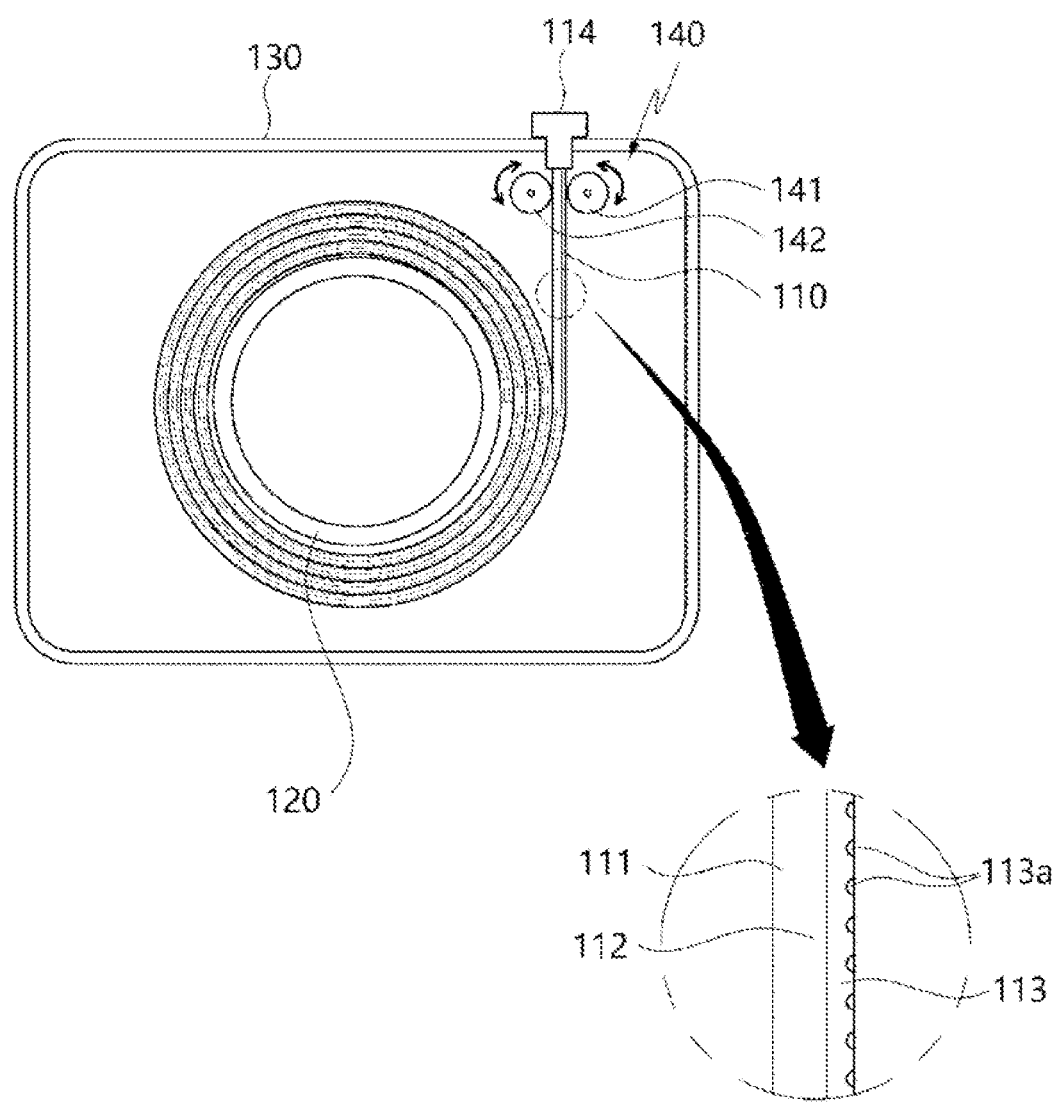
FIG. 3 is a cross-sectional view taken along line III-III of FIG. 1.

FIGS. 1 and 2 are perspective views illustrating a portable electronic device 100 having a rollable display structure according to an exemplary embodiment of the present disclosure, and FIG. 3 is a cross-sectional view taken along line III-III of FIG. 1.

When described with reference to FIGS. 1 to 3, the portable electronic device 100 according to the present disclosure includes a rollable display panel 110, a display drum 120, a housing 130, and a self-standing guide unit 140.

The rollable display panel 110 is made of a flexible material, and as long as a rollable display structure is implementable, the flexible material may be applicable to embodiments of the present disclosure regardless of the image display means. For example, the rollable display panel 110 according to the present disclosure may be provided in a type of a flexible liquid crystal display panel, an organic light emitting display panel, or an electrophoretic display panel.

The display drum 120 is rotatably installed inside the housing 130. The display drum 120 having a cylindrical shape rolls the rollable display panel 110 to allow the rollable display panel 110 to be accommodated in the housing 130 as shown in FIG. 1, and unrolls the rollable display panel 110 to allow the rollable display panel 110 to be unrolled out of the housing 130 to display an image as shown in FIG. 2. Here, as shown in FIG. 2, a display drawing-out slot 131 through which the rollable display panel 110 passes when the rollable display panel 110 is rolled or unrolled is formed on an upper surface of the housing 130.

The self-standing guide unit 140 guides the rollable display panel 110 to be curved in an arc shape so that the rollable display panel 110 may stand upright on its own when the rollable display panel 110 is unrolled from the display drum 120 and drawn out of the housing 130.

That is, as shown in FIG. 2, when the rollable display panel 110 having flexibility is unrolled, the upper end thereof is drooping downward and bent in a case where the rollable display panel 110 has no separate support structure. However, when the lower end of the rollable display panel 110 is curved in an arc shape while the rollable display panel 110 is unrolled, the rollable display panel 110 itself may be maintained in an unrolled state as shown in FIG. 2.

In the present disclosure, the self-standing guide unit 140 is installed inside the housing 130 as an example, and as shown in FIG. 3, for example, the self-standing guide unit 140 is installed between the display drum 120 and the display drawing-out slot 131, so as to guide the rollable display panel 110.

According to the above configuration, without adding a separate support structure for supporting the rollable display panel 110 to maintain the rollable display panel 110 in an unrolled state, when the rollable display panel 110 is drawn out of the housing 130, the self-standing guide unit 140 guides the rollable display panel 110 to be curved in an arc shape inside the housing 130, so that the rollable display panel 110 may stand upright on its own, whereby the overall size and weight of the portable electronic device 100 having the rollable display structure may be reduced.

In the present disclosure, as an example, the display drawing-out slot 131 has a curved shape to have a predetermined curvature in the horizontal direction of the rollable display panel 110 as shown in FIG. 2, in response to the lower end of the rollable display panel 110 being unrolled in a curved state in an arc shape by the self-standing guide unit 140. Accordingly, even when the width of the display drawing-out slot 131 is not formed relatively wide, the phenomenon in which the surface of the rollable display panel 110 collides with the inner wall surface of the display pull-out slot 131 and is damaged may be prevented from occurring in a process where the rollable display panel 110 is drawn out through the display drawing-out slot 131.

Meanwhile, the portable electronic device 100 according to the exemplary embodiment of the present disclosure may further include an upper self-standing cover 114 as shown in FIGS. 1 to 3.

The upper self-standing cover 114 is provided in a shape of covering an upper edge part of the rollable display panel 110. As shown in FIG. 3, the upper self-standing cover 114 is formed thicker than the thickness of the rollable display panel 110, so that when the rollable display panel 110 is rolled around the display drum 120, as shown in FIG. 1, the rollable display panel 110 is in a state of being caught in the display drawing-out slot 131 of the housing 130. In this way, a user unrolls a rollable display panel 110 by holding an upper self-standing cover 114 exposed to the outside of a housing 130, and when a rollable display panel 110 is rolled around a display drum 120, the rollable display panel 110 may be maintained in a state of being caught without being rolled to a position inside the housing 130.

Here, the upper self-standing cover 114 may be provided to have a curved shape corresponding to the curved shape of the display drawing-out slot. However, it is not essential for the upper self-standing cover 114 to have the curved shape, and even when the upper self-standing cover 114 has a straight bar shape, a lower region of the rollable display panel 110 is curved in an arc shape by the self-standing guide unit 140, whereby the rollable display panel 110 may stand upright on its own.

Referring to FIG. 3, the rollable display panel 110 according to the present disclosure includes, as an example, a display panel layer 111, a touch panel layer 112, and a protective film layer 113. In this case, the touch panel layer 112 is not an essential component of the rollable display panel 110, but is interpreted as an additional component of the rollable display panel 110.

In the exemplary embodiment shown in FIG. 3, as an example, the display panel layer 111 is disposed on a position in a direction toward a display drum 120, that is, on an inner side of the rollable display panel 110, and while disposed on an outer side of the rollable display panel 110, the protective film layer 113 is rolled around the display drum 120, but it doesn't matter when the direction is changed inversely. As shown in FIG. 3, when the protective film layer 113 is disposed on a position in an outward direction from the display drum 120, a plurality of holes 113a is formed on the surface of the protective film layer 113, so the rollable display panel 110 according to the present disclosure may be more smoothly rolled around the display drum 120.

Hereinafter, exemplary embodiments of the self-standing guide unit 140 of the portable electronic device 100 according to the exemplary embodiment of the present disclosure will be described in detail with reference to FIGS. 4 to 6.

Figure 4:
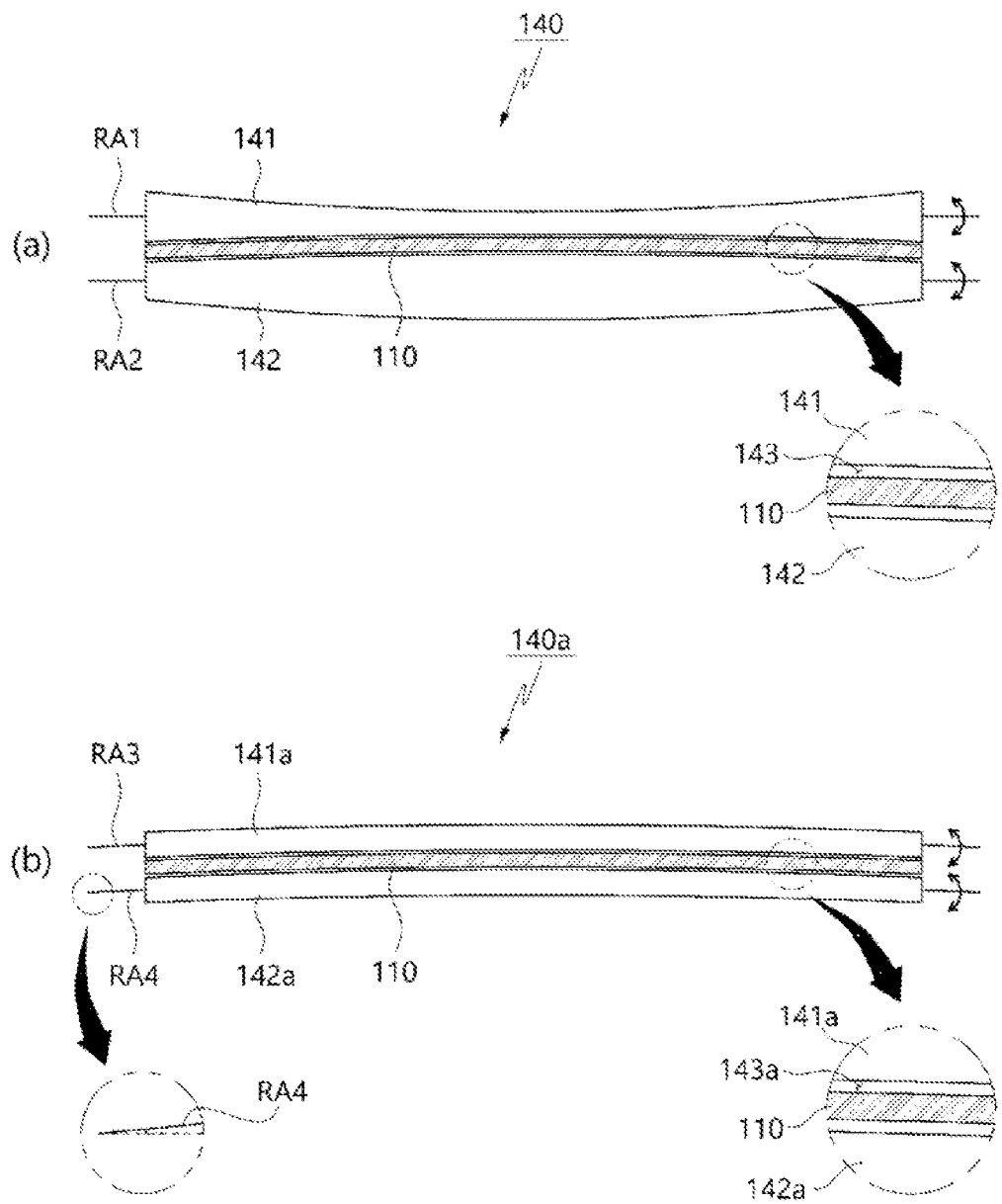
FIGS. 4 to 6 are views illustrating exemplary embodiments of a self-standing guide unit of the portable electronic device having the rollable display structure according to the exemplary embodiment of the present disclosure.

Referring to FIG. 4, the self-standing guide unit 140 according to the exemplary embodiment of the present disclosure may include a first guide roller 141 and a second guide roller 142.

As shown in FIG. 3, the first guide roller 141 is rotatably installed between the display drum 120 and the display drawing-out slot 131. The second guide roller 142 rotates in a state where the first guide roller 141 is spaced apart from the second guide roller 142 so that a guide slot 143 through which the rollable display panel 110 passes is formed between the first guide roller 141 and second guide roller 142. In the exemplary embodiment according to the present disclosure, as an example, the first guide roller 141 and the second guide roller 142 are installed inside the housing 130 so as to rotate freely.

Here, the guide slot 143 formed between the first guide roller 141 and the second guide roller 142 has a curved shape in the horizontal direction so that the rollable display panel 110 is curved in an arc shape when passing therethrough. Accordingly, the rollable display panel 110 passing through the guide slot 143 is drawn out while being guided to be curved in the arc shape, and even in a state where the drawing-out is completed, the lower region of the rollable display panel 110 is maintained in the curved shape in the arc shape in accordance with the curved shape of the guide slot 143.

In the exemplary embodiment shown in FIG. 4(a), the first guide roller 141 has a concave curved surface formed thereon toward a central part thereof along a rotating shaft RA1, and the second guide roller 142 has a convex curved surface formed thereon toward a central part thereof along a rotating shaft RA2, whereby the guide slot 143 has a curved shape in the horizontal direction. Here, curvature of the curved surfaces of the first guide roller 141 and second guide roller 142 is designed so that the rollable display panel 110 may stand upright on its own when being maintained in an arc shape thereof, and the curvature obtained when the display guide slot 143 has the curved shape in the horizontal direction may also be determined according to the designed curvature.

In the self-standing guide unit 140a according to the exemplary embodiment shown in FIG. 4(b), as an example, the first guide roller 141a and the second guide roller 142a are curved to have an arc shape along the longitudinal direction, that is, the horizontal direction so that the guide slot 143a formed between the first guide roller 141a and the second guide roller 142a has a curved shape in the horizontal direction.

Here, a rotating shaft RA3 on each opposite side of the horizontal direction of the first guide roller 141a is formed to have a predetermined angle with respect to a direction in which the first guide roller 141a is curved, and similarly, a rotating shaft RA4 on each opposite side of the horizontal direction of the second guide roller 142a is formed to have a predetermined angle with respect to a direction in which the second guide roller 142a is curved. Accordingly, when the rollable display panel 110 is drawn out or retracted, the reversing of the curved direction of the rollable display panel 110 due to the fact that the first guide roller 141a and second guide roller 142a that come into contact with the rollable display panel 110 and freely rotate are rotating, like jumping rope, around each axis of the opposite sides is prevented from occurring.

Figure 5:
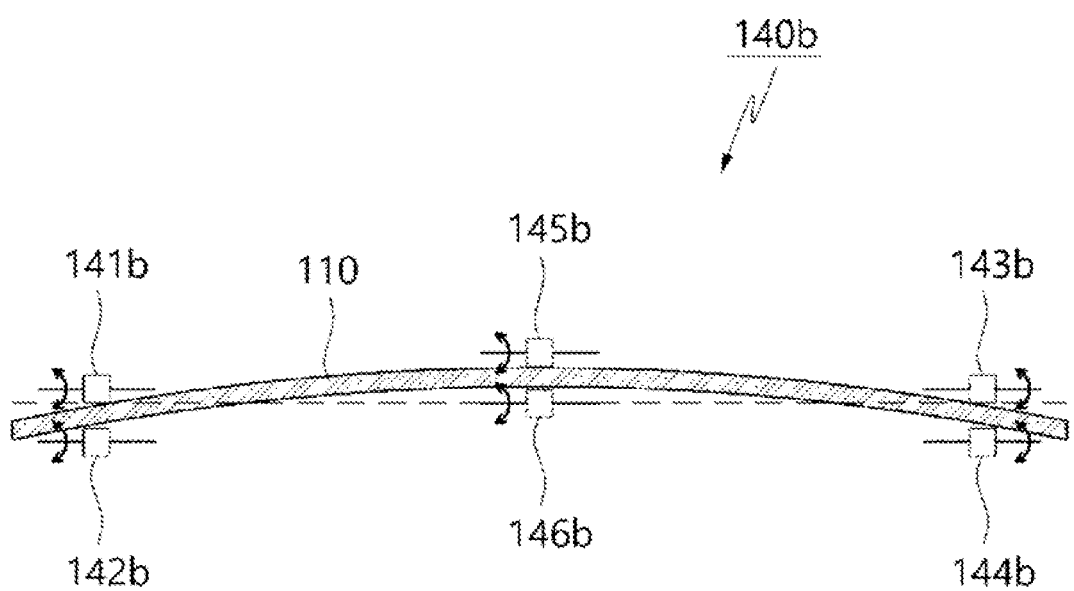

Referring to the exemplary embodiment shown in FIG. 5, a self-standing guide unit 140b may include a first side guide unit, a second side guide unit, and an inner guide unit.

The first side guide units 141b and 142b guide an edge region of one side of the rollable display panel 110 in the horizontal direction. In addition, the second side guide units 143b and 144b guide an edge region of the opposite side of the rollable display panel 110 in the horizontal direction. Here, in the exemplary embodiment shown in FIG. 5, as an example, the first side guide units 141b and 142b and the second side guide units 143b and 144b include each pair of side guide rollers 141b and 142b, and 143b and 144b, rotating in a state of respectively contacting the front and rear surfaces of the rollable display panel 110 so as to guide the drawing-out and retraction of the rollable display panel 110.

The inner guide units 145b and 146b guide the rollable display panel 110 between the first side guide units 141b and 142b and the second side guide units 143b and 144b. In the exemplary embodiment shown in FIG. 5, as an example, each of inner guide units 145b and 146b is installed in a middle region between the first side guide units 141b and 141b and the second side guide units 143b and 144b, but a plurality of inner guide units may be installed at regular intervals.

Here, the inner guide units 145b and 146b are disposed to be deviated from an extension line (EL) between the first side guide units 141b and 142b and the second side guide units 143b and 144b, so when the rollable display panel 110 is unrolled from the display drum 120, the inner guide units 145b and 146b guide the rollable display panel 110 to be curved in an arc shape.

In the exemplary embodiment shown in FIG. 5(a), as an example, the inner guide units 145b and 146b include a pair of inner guide rollers 145b and 146b, and while rotating in a state of respectively contacting the front and rear surfaces of the rollable display panel 110, the pair of inner guide rollers 145b and 146b guide the rollable display panel 110 at respective positions deviated from the extension line (EL) between the first side guide unit 141b and 142b and the second side guide unit 143b and 144b.

In the exemplary embodiment shown in FIG. 5, as an example, while rotating in a state of contacting the rollable display panel 110 in a direction deviated from the extension line (EL), one inner guide roller 146b guides the rollable display panel 110 at a position deviated from the extension line (EL) between the first side guide unit 141b and 142b and the second side guide unit 143b and 144b.

According to the above configuration, a designed space inside the housing 130 may be secured more widely by guiding the rollable display panel 110 to be curved in an arc shape while guiding only the opposite edge regions and middle region without guiding the entire region of the rollable display panel 110 in the horizontal direction.

Prior to describing the exemplary embodiment shown in FIG. 6, it will be described that each surface of opposite sides of the rollable display panel 110 is divided into a first surface configured to face the display drum 120 when rolled around the display drum 120 and a second surface on the opposite side of the first surface. In the exemplary embodiment shown in FIG. 3, the first surface becomes the surface of the display panel layer 111, and the second surface becomes the surface of the protective film layer 113.

Figure 6:
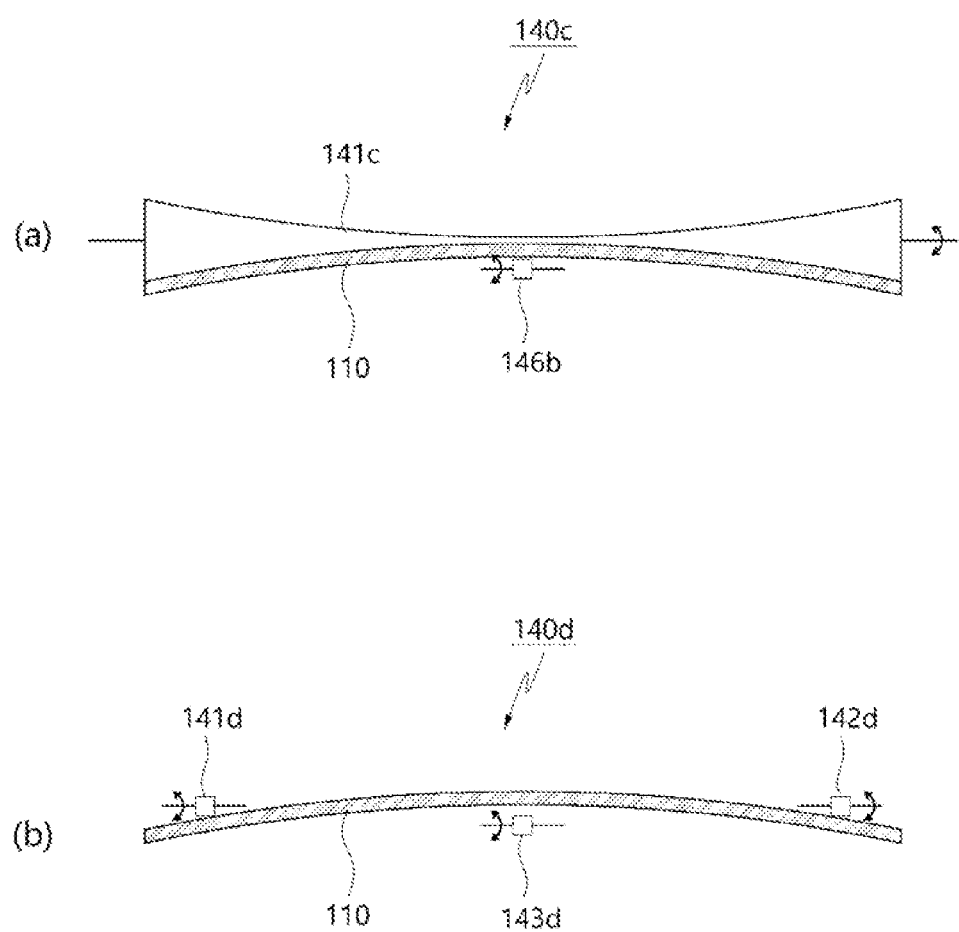

In the exemplary embodiment shown in FIG. 6, as an example, self-standing guide units 140c and 140d guide the rollable display panel 110 in a state of contacting the second surface of the rollable display panel 110.

In the exemplary embodiment shown in FIG. 6(a), as an example, a self-standing guide unit 140c includes a concave guide roller 141c rotatably installed between the display drum 120 and the display drawing-out slot 131.

In this case, the surface of the concave guide roller 141c is formed to be concave in the direction of the second surface so that when the rollable display panel 110 is unrolled from the display drum 120, the rollable display panel 110 is curved in an arc shape.

Describing more in detail with reference to FIG. 3, in the state in which the rollable display panel 110 is rolled around the display drum 120, a force acts in the direction in which the rollable display panel 110 is unrolled from the display drum 120, that is, the force acts outwardly in the radial direction of the display drum 120. Accordingly, when the concave guide roller 141c having a concave shape is disposed on the second surface side, the curved state of the rollable display panel 110 may be maintained in the arc shape as shown in FIG. 6(a).

In the exemplary embodiment shown in FIG. 6(b), as an example, a self-standing guide unit 140d includes: a first side guide roller 141d; and a second side guide roller 142d.

The first side guide roller 141d rotates in a state of contacting the second surface of an edge region of one side of the rollable display panel 110 in the horizontal direction. In addition, the second side guide roller 142d rotates in a state of contacting the second surface of an edge region of the other side of the rollable display panel 110 in the horizontal direction. Through such a configuration, the edge regions on the opposite sides of the rollable display panel 110 in the horizontal direction are supported in the second surface direction, and as described above, the force spreading out in the radial direction of the display drum 120 acts on the rollable display panel 110, and thus the curved state of the rollable display panel 110 in the arc shape may be maintained as shown in FIG. 6(b).

In the exemplary embodiments shown in FIG. 6, the self-standing guide units 140c and 140d may further include inner guide rollers 142c and 143d, respectively. In the exemplary embodiment shown in FIG. 6(a), the inner guide roller 142c guides the rollable display panel 110 in the middle region of the rollable display panel 110 in the horizontal direction, and is disposed such that the rollable display panel 110 passes through a gap between the inner guide roller 142c and the concave guide roller 141c in the middle region, thereby enabling that the rollable display panel 110 may be more stably maintained in the arc shape.

In the exemplary embodiment shown in FIG. 6(b), as an example, the inner guide roller 143d guides the rollable display panel 110 between the first side guide roller 141d and the second side guide roller 142d, and guides the rollable display panel 110 in a state of contacting the first surface of the rollable display panel 110 while being disposed to be deviated, in a direction of the second surface, from the extension line between the first side guide roller 141d and the second side guide roller 142d. Accordingly, the rollable display panel 110 may more stably maintain the arc shape.

Figure 7:
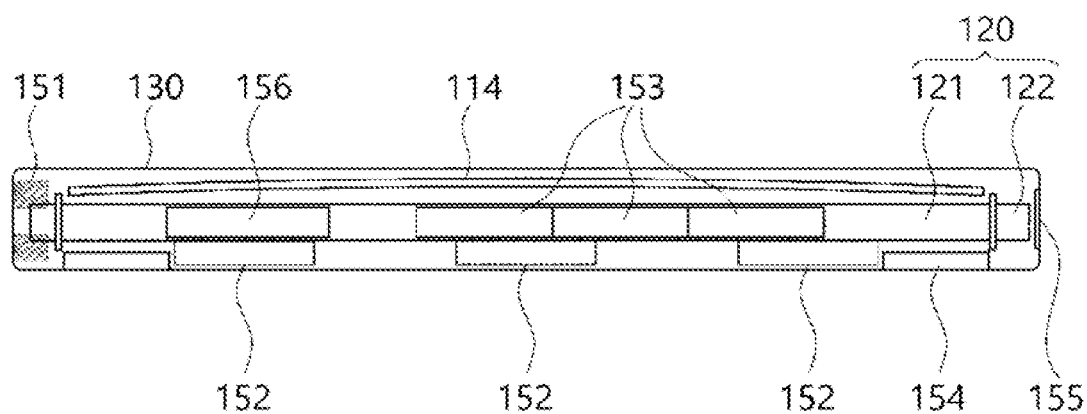
FIG. 7 is a view illustrating an example of an internal configuration of the portable electronic device having the rollable display structure according to the exemplary embodiment of the present disclosure.

FIG. 7 is a view illustrating an example of an internal configuration of the portable electronic device 100 having the rollable display structure according to the exemplary embodiment of the present disclosure. The exemplary embodiment shown in FIG. 7 illustrates an example in which the portable electronic device 100 according to the present disclosure is implemented as a computer such as a tablet or a laptop.

As described above, the portable electronic device 100 is installed inside the housing 130 in a state in which the rollable display panel 110 is rolled around the display drum 120. In addition, the self-standing guide unit 140 is installed inside the housing 130 so as to guide the self-standing of the rollable display panel 110.

In the present disclosure, the display drum 120 is manufactured to have an empty cylindrical shape, and a battery 153 is disposed inside the display drum, whereby space utilization may be increased. A main board is disposed on an edge of one side in the housing 130, and may be disposed inside the housing 130 in a bent form to increase the space utilization.

A communication module and antenna 152 for connection with a mobile communication network such as LTE or 5G communication, and connection with an Internet network such as WiFi may be disposed along the horizontal direction of the display drum 120. In addition, a speaker 154 is also installed along an installation direction of the communication module and antenna 152, and is preferably disposed so as to face forward according to the characteristics of the speaker 154.

Here, as shown in FIGS. 1 and 2, a power button 155 may be installed on one side of an outer side of the housing 130, and as shown in FIG. 7, a power line is connectable inside the display drum 120 having a cylindrical shape. Similarly, as an example, a driving driver 156 configure to drive the rollable display panel 110 by receiving an image signal from the main board 151 is disposed inside the display drum 120.

An internal configuration of the portable electronic device 100 shown in FIG. 7 is an exemplary embodiment of the present disclosure, and it may be apparent that the technical spirit of the present disclosure is not limited thereto.

Meanwhile, the portable electronic device 100 according to the exemplary embodiment of the present disclosure may further include a torsion spring 163 and a stopper unit 160.

The torsion spring 163 is installed on the display drum 120, and applies a torque in a direction in which the rollable display panel 110 is rolled around the display drum 120. In the exemplary embodiment shown in FIG. 8, as an example, the torsion spring 163 has a form of a plate spring rolled in a shape of a windup spring inside the display drum 120, but it may be apparent that the display drum 120 is applicable in another form that may apply a torque in a direction in which the rollable display panel 110 is rolled.

The stopper unit 160 controls to prevent the rollable display panel 110 from being rolled into the housing by the torsion spring while the rollable display panel 110 is unrolled from the display drum 120.

Figure 8:
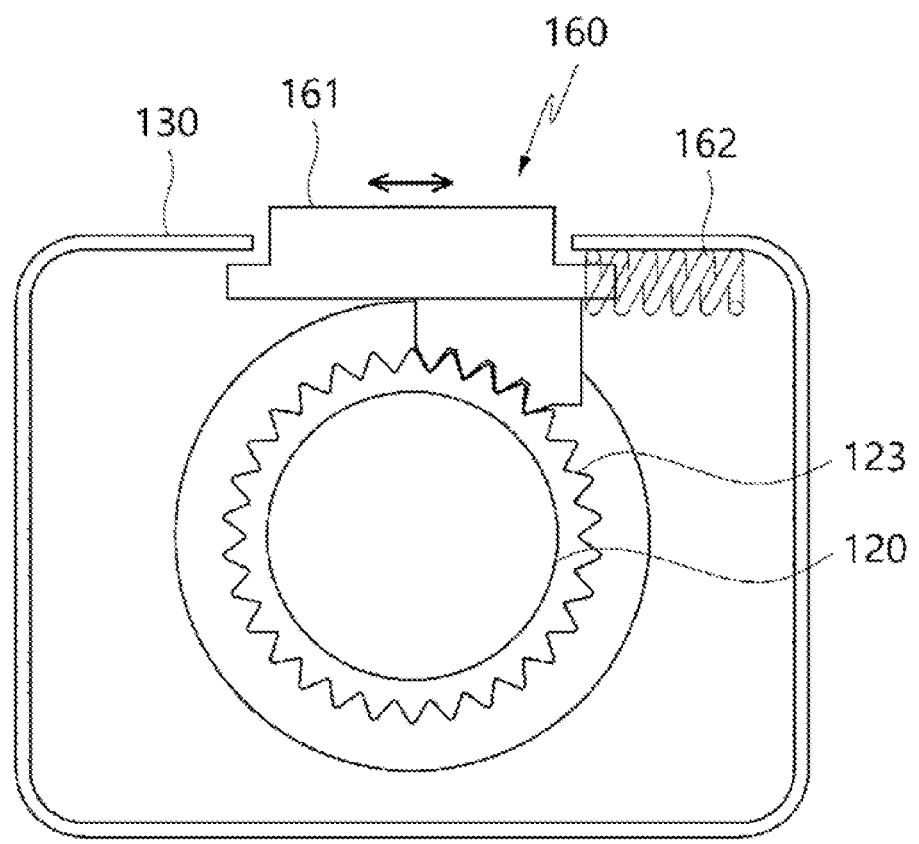
FIG. 8 is a view illustrating an example of a stopper unit of the portable electronic device having the rollable display structure according to the exemplary embodiment of the present disclosure.

Referring to the example shown in FIG. 8 in more detail, the stopper unit 160 may include a stopper member 161 and an elastic spring 162. The stopper member 161 is installed in the housing 130 to be movable between a locking position caught by a plurality of locking jaws 123 formed on the display drum 120 and a release position spaced apart from the locking jaws 123.

Here, the locking jaws 123 are formed on an outer surface of the display drum 120 along a rotation direction of the display drum 120. As shown in FIG. 7, as an example, the display drum 120 may be divided into a rolling region 121 on which the rollable display panel 110 is rolled, and an extension region 122 extending to either side of opposite sides of the rolling region 121 in the horizontal direction, and each locking jaw 123 is formed on the outer surface of the extension region 122 along the rotation direction of the display drum 120.

In addition, the elastic spring 162 presses the stopper member 161 in the direction of the locking position to block the rollable display unit from being rolled into the housing by the torque of the torsion spring 163.

According to the above configuration, when a user pulls up the upper self-standing cover 114 and unrolls the rollable display panel 110, the locking jaws 123 push the stopper member 161 by the pulling force generated by the user and the locking is released, so that the display drum 120 is rotated, whereby the rollable display panel 110 may be unrolled. In addition, when the user releases the upper self-standing cover 114 in a state in which the rollable display panel 110 is unrolled, the elastic spring 162 pushes the stopper member 161 in the direction of the locking position so that the stopper member 161 is caught by the locking jaws 123 of the display drum 120, whereby the rollable display panel 110 is maintained in an unrolled state.

In addition, in a case where the user desires to roll the rollable display panel 110 on the display drum 120, when the stopper member 161 is moved in the direction of the release position, the torsion spring 163 installed on the display drum 120 rotates the display drum 120, so that the rollable display panel 110 is rolled around the display drum 120.

According to the above configuration, only by an operation of pulling the rollable display panel 110 and a simple operation of moving the stopper member 161, the portable electronic device 100 according to the present disclosure may be usable.

Figure 9:
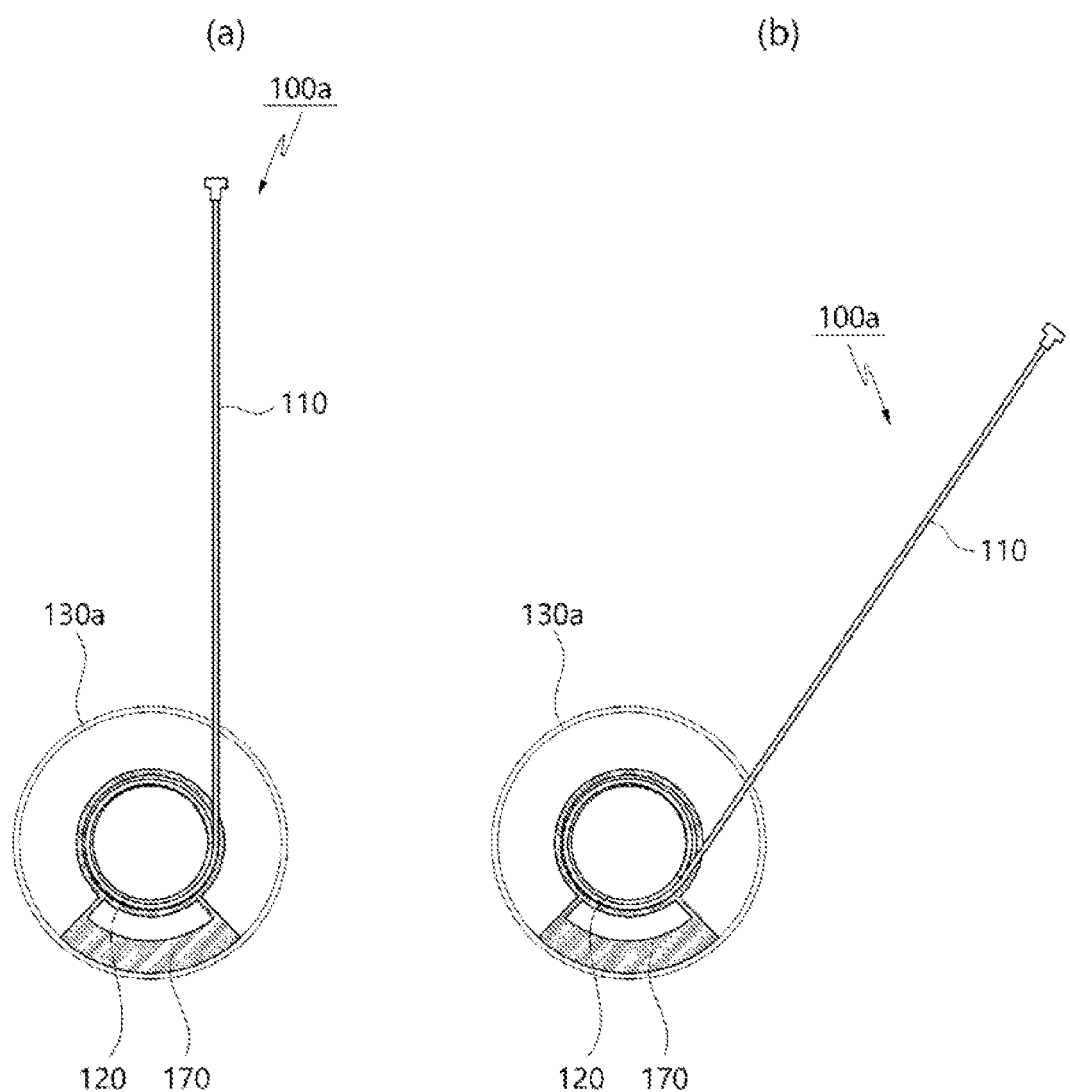
FIG. 9 is a view illustrating a portable electronic device having a rollable display structure according to another exemplary embodiment of the present disclosure.

FIG. 9 is a view illustrating the portable electronic device 100a having the rollable display structure according to another exemplary embodiment of the present disclosure. As an example, the portable electronic device 100a according to the exemplary embodiment shown in FIG. 9 has a cylindrical shape of a housing 130a.

In addition, the portable electronic device 100a according to the exemplary embodiment shown in FIG. 9 further includes a weight 170 installed in the housing 130, the weight being movable along the circumference of the display drum 120. As shown in FIGS. 9(a) and 9(b), even when the user positions the rollable display panel 110 in a state in which an angle between the rollable display panel 110 and the ground is tilted to a specific angle, the weight 170 is positioned on the bottom of the housing 130a having a cylindrical shape in accordance with a position where the housing 130a having the cylindrical shape is rolled, thereby maintaining the corresponding tilted state.

Accordingly, the user may adjust a use state of the portable display device only by moving the rollable display panel 110 at a desired inclination in a state of enabling the rollable display panel 110 to stand upright on its own.

Figure 10:
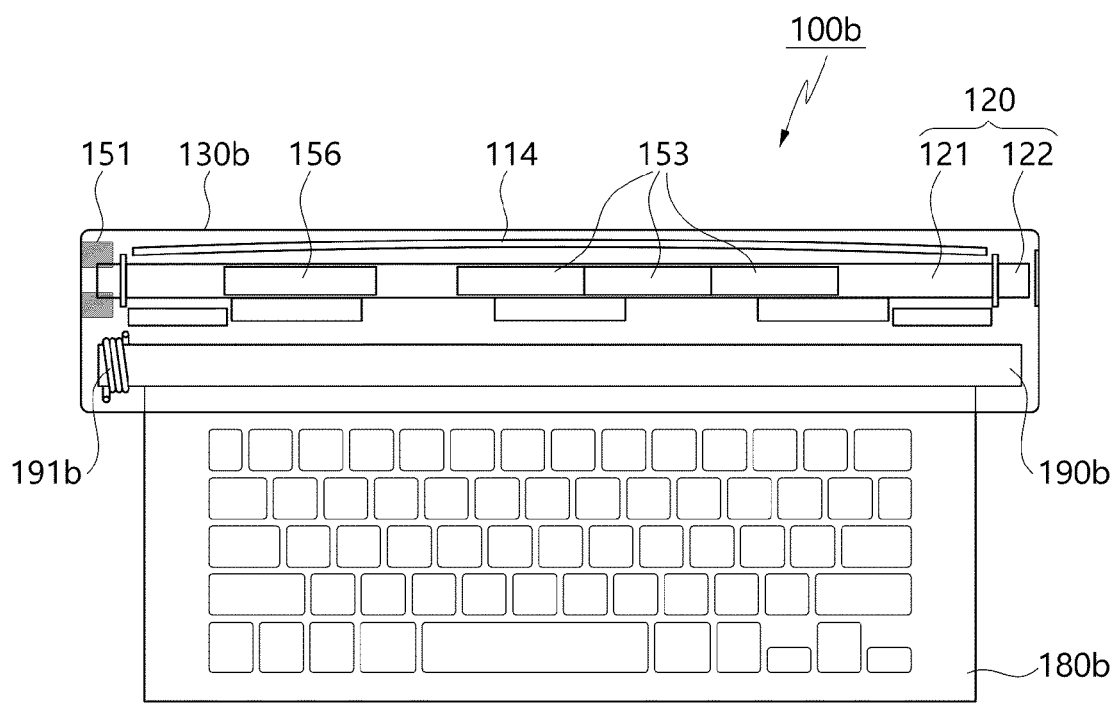
FIG. 10 is a view illustrating a portable electronic device having a rollable display structure according to yet another exemplary embodiment of the present disclosure.

FIG. 10 is a view illustrating a portable electronic device 100b having a rollable display structure according to yet another exemplary embodiment of the present disclosure. Referring to FIG. 10, the portable electronic device 100b according to yet another exemplary embodiment of the present disclosure further includes a rollable keyboard 180b and a keyboard drum 190b.

The rollable keyboard 180b is used as an input device. Here, the rollable keyboard 180b may be configured to be connected to the main board 151 through a wire inside a housing 130b, and may be configured to be connected to the main board through short-range communication such as Bluetooth.

The keyboard drum 190b is rotatably installed inside the housing 130b so that the rollable keyboard 180b is rolled or unrolled. Here, in the housing 130b, a keyboard slot (not shown) through which the rollable keyboard 180b passes is formed to face forward so that the rollable keyboard 180b rolled around the keyboard drum 190b is unrolled to the outside of the housing 130b.

According to the above configuration, when using the rollable keyboard 180b, the user pulls the rollable keyboard 180b and uses the rollable keyboard in an unrolled state, and then pushes the rollable keyboard 180b back into the housing 130b, whereby the portability of the portable electronic device 100b according to the present disclosure may be further improved.

Here, a mechanism for rolling and unrolling the rollable keyboard 180b on the keyboard drum 190b may be configured in response to a mechanism in which the above-described rollable display panel 110 is rolled or unrolled around the display drum 120. In FIG. 10, as an example, the torsion spring 191b is installed on an edge region of one side of the keyboard drum 190b, and the stopper unit (not shown) controls to prevent the torque applied by the torsion spring 163, so that the drawing-out and the retraction of the rollable keyboard 180b may be possible through the operation of pulling the rollable keyboard 180b and the operation of the stopper unit.

Figure 11:
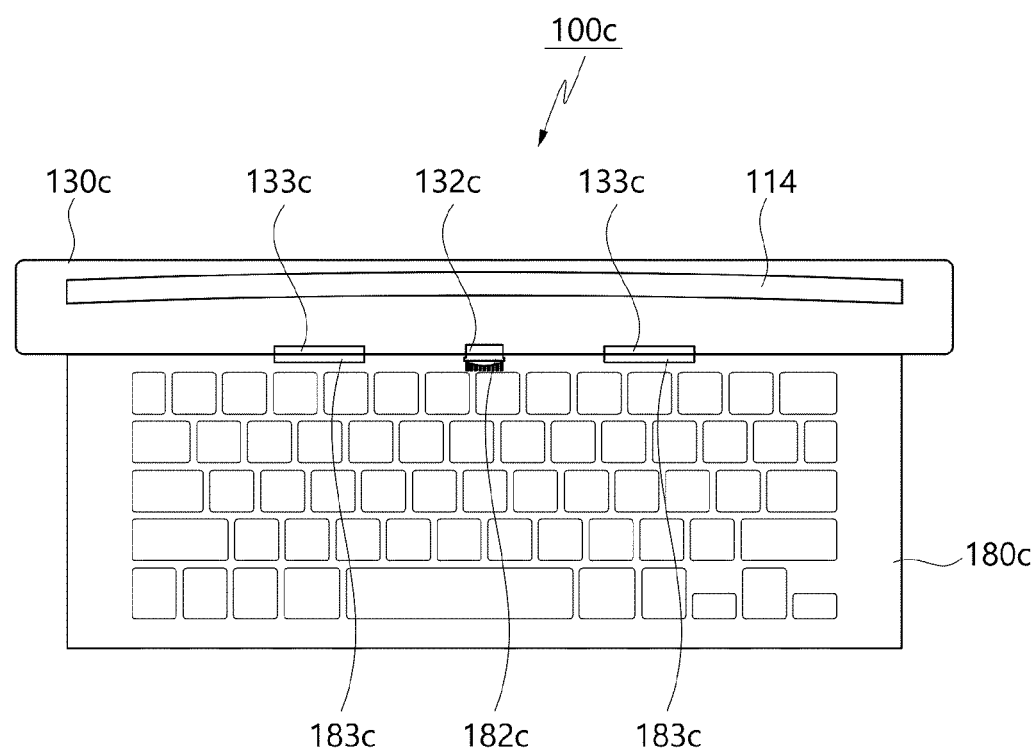
FIGS. 11 and 12 are views illustrating a portable electronic device having a rollable display structure according to still another exemplary embodiment of the present disclosure.
Figure 12:
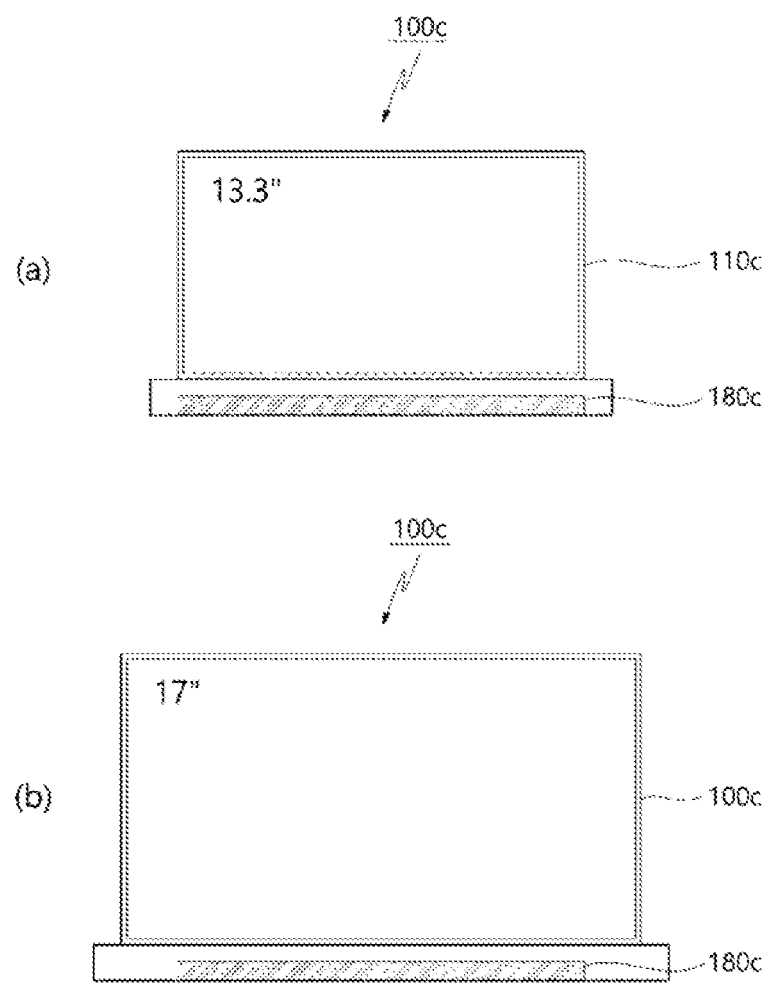

FIGS. 11 and 12 are views illustrating a portable electronic device 100c having a rollable display structure according to still another exemplary embodiment of the present disclosure. The portable electronic device 100c according to still another exemplary embodiment of the present disclosure has a structure in which a detachable keyboard 180c is detachably attached to the housing 130c.

Describing more in detail with reference to FIG. 11, a detachable keyboard 180c includes a first connector 132c and at least one first permanent magnet 133c.

The first connect or 132c is in contact with a second connector 182c formed in the housing 130c for transmission of an input signal generated when the user presses a button of the detachable keyboard 180c. The first permanent magnet 133c generates a magnetic force in a direction of a surface on which the first connector 132c is formed, that is, in a direction of a surface facing the housing 130c when the detachable keyboard 180c is coupled to the housing 130c. In the present disclosure, as an example, inside the detachable keyboard 180c, two first permanent magnets 133c are installed on opposite sides of the first connector 132c, but the technical spirit of the present disclosure is not limited thereto.

The second connector 182c is exposed toward the front of the housing 130c, and connected to the first connector 132c.

In addition, a second permanent magnet 183c is installed in the housing 130c, and is disposed at a position corresponding to the first permanent magnet 133c, so that when the detachable keyboard 180c approaches the front of the housing 130c and the first connector 132c is connected to the second connector 182c, the second permanent magnet 183c and the first permanent magnet 133c are attached to each other by the magnetic force.

According to the above configuration, the detachable keyboard 180c having the first connector 132c formed therein is connected to the second connector 182c at the front of the housing 130c, and a state in which the detachable keyboard 180c and the housing 130 are coupled to each other by the magnetic force between the first permanent magnet 133c and the second permanent magnet 183c may be stably maintained.

FIG. 12 is a view illustrating an example of utilization of the portable electronic device 100c according to the exemplary embodiment shown in FIG. 11. As shown in FIG. 12, the housing 130c and detachable keyboard 180c of the portable electronic device 100c are manufactured in a detachable form, the first connector 132c and the second connector 182c are standardized, and the positions of the first permanent magnet 133c and second permanent magnet 183c are standardized, so that different sizes of the rollable display panel 110c may be usable on one detachable keyboard 180c, whereby usability of a main body on the detachable keyboard 180c and the housing 130c may be improved.

Figure 13:
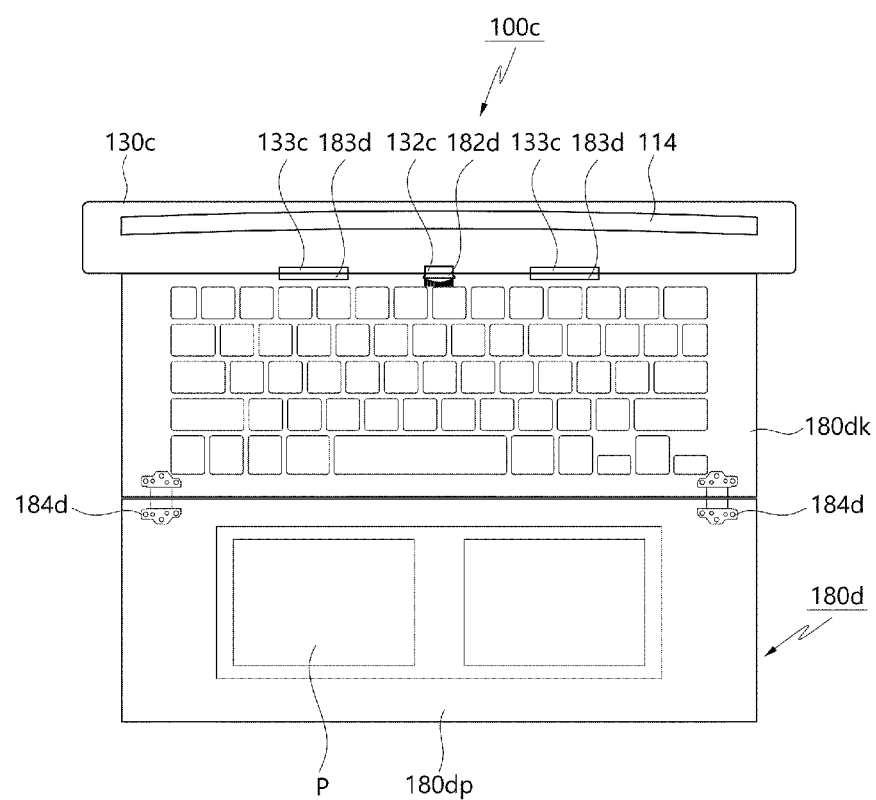
FIG. 13 is a view illustrating a portable electronic device having a rollable display structure according to still another exemplary embodiment of the present disclosure.

FIG. 13 is a view illustrating a portable electronic device 100d having a rollable display structure according to still another exemplary embodiment of the present disclosure. The portable electronic device 100d shown in FIG. 13 is a modified example of the portable electronic device 100 shown in FIG. 11, and may include a foldable keyboard 180d on which a touch pad P is provided. Here, as in the exemplary embodiment shown in FIG. 11, a combination of the foldable keyboard 180d and the housing 130c may be performed through the first connector 132c, the second connector 182c, the first permanent magnet 133c, and the second permanent magnet 183c.

In addition, for the convenience of portability of the foldable keyboard 180d, the foldable keyboard 180d has a structure in which a keyboard unit 180dk and a touchpad unit 180dp are folded through a hinge module 184d, so that a keyboard region and a touchpad region may be folded. In the case of the portable electronic device 100d shown in FIG. 13, the internal space of the foldable keyboard 180d is widened, so similar to a laptop computer, hardware components such as a main board and the like are installed on the foldable keyboard 180d, and only the components necessary for driving the rollable display panel 110 are installed inside the housing 130c, whereby the portable electronic device 100d of various product groups may be implemented.

Although the exemplary embodiments of the present disclosure have been described above with reference to the accompanying drawings, it will be understood that those skilled in the art to which the present disclosure pertains may implement the present disclosure in other specific forms without departing from the technical spirit or essential features thereof. Therefore, it should be understood that the above-described exemplary embodiments are illustrative in all respects and not restrictive.

DESCRIPTION OF THE REFERENCE NUMERALS IN THE DRAWINGS 100, 100a, 100b, 100c, 100d: portable electronic device
110: rollable display panel 111: display panel layer
112: touch panel layer 113: protective film layer
113a: hole 114: upper self-standing cover
120: display drum 121: rolling region
122: extension region 123: locking jaws
130, 130a, 130b, 130c: housing 131: display drawing-out slot
132c: first connector 133c: first permanent magnet
140, 140a, 140b, 140c, 140d: self-standing guide unit
141, 141a: first guide roller 141c: concave guide roller
141d: first side guide roller 142, 142a: second guide roller
142d: second side guide roller 143, 143a: guide slot 141b, 142b, 143b, 144b: side guide roller
142c, 143d, 145b, 146b: inner guide roller
151: main board 152: antenna
153: battery 154: speaker
155: power button 156: driving driver
160: stopper unit 161: stopper member
162: elastic spring 163: torsion spring
170: weight 180b: rollable keyboard
180c: detachable keyboard 180d: foldable keyboard
182c: second connector 183c: second permanent magnet
190b: keyboard drum

INDUSTRIAL APPLICABILITY

In the present disclosure, in a portable electronic device such as a laptop, a tablet, and a notebook, a display for displaying an image may be applicable to the portable electronic device having a rollable display structure.

What is claimed is:

1. A portable electronic device having a rollable display structure, the device comprising:
a rollable display panel configured to display an image;
a display drum configured to rotate so that the rollable display panel is rolled or unrolled;
a housing provided with the display drum rotatably installed therein, and comprising a display drawing-out slot through which the rollable display panel passes when the rollable display panel is rolled or unrolled; and
a self-standing guide unit configured to guide the rollable display panel to be curved in an arc shape so that the rollable display panel stands upright on its own when the rollable display panel is unrolled from the display drum and drawn out of the housing,
wherein the self-standing guide unit is installed between the display drum and the display drawing-out slot to guide the rollable display panel, and
wherein the self-standing guide unit comprises:
a first guide roller rotatably installed between the display drum and the display drawing-out slot; and
a second guide roller configured to rotate in a state of being spaced apart from the first guide roller so that a guide slot through which the rollable display panel passes is formed between the first guide roller and the second guide roller, and
wherein the guide slot has a curved shape in a horizontal direction, so as to allow the rollable display panel to be curved in the arc shape when the rollable display panel passes therethrough.

2. The device of claim 1, wherein the first guide roller has a convex curved surface formed thereon toward a central part thereof along a rotating shaft thereof, and
the second guide roller has a concave curved surface formed thereon toward a central part thereof along a rotating shaft thereof, whereby the guide slot has the curved shape in the horizontal direction.

3. The device of claim 1, wherein the first guide roller and the second guide roller are curved to have the arc shape in a longitudinal direction so that the guide slot has the curved shape in the horizontal direction,
a rotating shaft on opposite sides of the first guide roller are formed to have a predetermined angle in a direction in which the first guide roller is curved, and
a rotating shaft on opposite sides of the second guide roller are formed to have a predetermined angle in a direction in which the second guide roller is curved.

4. The device of claim 1, further comprising:
a rollable keyboard as an input device; and
a keyboard drum rotatably installed inside the housing so that the rollable keyboard is rolled or unrolled,
wherein a keyboard slot through which the rollable keyboard passes is formed in the housing toward a front thereof so that the rollable keyboard rolled around the keyboard drum is unrolled out of the housing.

5. The device of claim 1, further comprising:
a first connector for signal transmission;
a detachable keyboard having at least one first permanent magnet generating a magnetic force in a direction of a surface on which the first connector is formed;
a second connector exposed toward a front of the housing so as to allow the first connector to connect thereto; and
a second permanent magnet installed in the housing and disposed at a position corresponding to the first permanent magnet when the first connector is connected to the second connector by the detachable keyboard approaching the front of the housing.

6. The device of claim 1, further comprising:
a first connector for signal transmission;
at least one first permanent magnet generating a magnetic force in a direction of a surface on which the first connector is formed;
a keyboard unit having a keyboard formed thereon;
a touch pad unit having a touch pad formed thereon;
a foldable keyboard having a hinge module configured to connect the keyboard unit and the touch pad unit so as to fold the keyboard unit and the touch pad unit;
a second connector exposed toward a front of the housing so as to allow the first connector to connect thereto; and
a second permanent magnet installed in the housing and disposed at a position corresponding to the first permanent magnet when the first connector is connected to the second connector by a detachable keyboard approaching the front of the housing.

7. A portable electronic device having a rollable display structure, the device comprising:
a rollable display panel configured to display an image;
a display drum configured to rotate so that the rollable display panel is rolled or unrolled;
a housing provided with the display drum rotatably installed therein, and comprising a display drawing-out slot through which the rollable display panel passes when the rollable display panel is rolled or unrolled; and
a self-standing guide unit configured to guide the rollable display panel to be curved in an arc shape so that the rollable display panel stands upright on its own when the rollable display panel is unrolled from the display drum and drawn out of the housing,
wherein the self-standing guide unit is installed between the display drum and the display drawing-out slot to guide the rollable display panel, and
wherein the self-standing guide unit comprises:
a first side guide unit configured to guide an edge region of one side of the rollable display panel in a horizontal direction;
a second side guide unit configured to guide an edge region of the other side of the rollable display panel in the horizontal direction; and
at least one inner guide unit configured to guide the rollable display panel between the first side guide unit and the second side guide unit and be disposed to be deviated from an extension line between the first side guide unit and the second side guide unit, so as to bend the rollable display panel in the arc shape when the rollable display panel is unrolled from the display drum.

8. The device of claim 7, wherein the first side guide unit and the second side guide unit respectively comprise a pair of side guide rollers configured to guide the rollable display panel by rotating in a state of respectively contacting front and rear surfaces of the rollable display panel, and
the inner guide unit comprises an inner guide roller configured to rotate by contacting the rollable display panel in a direction deviated from the extension line between the first side guide unit and the second side guide unit.

9. A portable electronic device having a rollable display structure, the device comprising:
a rollable display panel configured to display an image;
a display drum configured to rotate so that the rollable display panel is rolled or unrolled;
a housing provided with the display drum rotatably installed therein, and comprising a display drawing-out slot through which the rollable display panel passes when the rollable display panel is rolled or unrolled; and
a self-standing guide unit configured to guide the rollable display panel to be curved in an arc shape so that the rollable display panel stands upright on its own when the rollable display panel is unrolled from the display drum and drawn out of the housing,
wherein the self-standing guide unit is installed between the display drum and the display drawing-out slot to guide the rollable display panel, and
wherein the rollable display panel comprises:
a first surface configured to face the display drum when rolled around the display drum; and
a second surface opposite the first surface, and
wherein the self-standing guide unit is configured to guide the rollable display panel in a state of contacting the second surface of the rollable display panel,
wherein the self-standing guide unit comprises a concave guide roller rotatably installed between the display drum and the display drawing-out slot, and
wherein a surface of the concave guide roller is formed to be concave in a direction of the second surface so as to bend the rollable display panel in the arc shape when the rollable display panel is unrolled from the display drum.

10. A portable electronic device having a rollable display structure, the device comprising:
a rollable display panel configured to display an image;
a display drum configured to rotate so that the rollable display panel is rolled or unrolled;
a housing provided with the display drum rotatably installed therein, and comprising a display drawing-out slot through which the rollable display panel passes when the rollable display panel is rolled or unrolled; and
a self-standing guide unit configured to guide the rollable display panel to be curved in an arc shape so that the rollable display panel stands upright on its own when the rollable display panel is unrolled from the display drum and drawn out of the housing,
wherein the rollable display panel comprises:
a first surface configured to face the display drum when rolled around the display drum; and
a second surface opposite the first surface, and
wherein the self-standing guide unit is configured to guide the rollable display panel in a state of contacting the second surface of the rollable display panel,
wherein the self-standing guide unit comprises:
a first side guide roller configured to rotate in a state of contacting the second surface of an edge region of one side of the rollable display panel in a horizontal direction;
a second side guide roller configured to rotate in a state of contacting the second surface of an edge region of the other side of the rollable display panel in the horizontal direction; and
an inner guide roller configured to guide the rollable display panel between the first side guide roller and the second side guide roller and be disposed to be deviated, in a direction of the second surface, from an extension line between the first side guide roller and the second side guide roller, so as to bend the rollable display panel in the arc shape when the rollable display panel is unrolled from the display drum.

11. The device of claim 10, further comprising:
a torsion spring installed on the display drum to apply a torque in a direction in which the rollable display panel is rolled around the display drum; and
a stopper unit configured to control the rollable display panel from being rolled into by the torsion spring in a state of being unrolled from the display drum.

12. The device of claim 11, wherein the display drum is divided into a rolling region on which the rollable display panel is rolled, and an extension region configured to extend to either side of opposite sides of the rolling region in the horizontal direction,
a plurality of locking jaws is formed on an outer surface of the extension region along the rotation direction of the display drum,
the stopper unit comprises:
a stopper member installed in the housing so as to be usable between a locking position caught on the locking jaws and a release position spaced apart from the locking jaws; and
an elastic spring pressing the stopper member in a direction of the locking position, and
rotation of the display drum overcomes a force applied by the elastic spring to retract the stopper member in the direction of the release position when the display drum rotates in a direction in which the rollable display panel is unrolled.

* * * * *